United States Patent [19]
McKenzie

[11] Patent Number: 5,459,940
[45] Date of Patent: Oct. 24, 1995

[54] APPARATUS AND PROCESS FOR DETERMINING TOP DEAD CENTER OF A PISTON AND CRANK SHAFT IN AN INTERNAL COMBUSTION ENGINE

[76] Inventor: James R. McKenzie, 6452 Tobe McGarrity Rd., Dallas, Ga. 30132

[21] Appl. No.: 150,218

[22] Filed: Nov. 10, 1993

[51] Int. Cl.$^6$ ............................ G01M 15/00; G01B 5/14
[52] U.S. Cl. ...................... 33/601; 33/600; 33/DIG. 15
[58] Field of Search ................. 33/601, 600, DIG. 15; 73/119 R

[56] References Cited

U.S. PATENT DOCUMENTS

| | | | |
|---|---|---|---|
| 1,485,429 | 3/1924 | Powell | 33/601 |
| 1,558,294 | 10/1925 | Sandbo | 33/601 |
| 1,609,714 | 12/1926 | Hash | 33/601 |
| 1,611,062 | 12/1926 | Peebles | 33/601 |
| 1,737,726 | 12/1929 | Muzyn | 33/601 |
| 2,471,746 | 5/1949 | Hilbert | 33/601 |
| 2,567,430 | 9/1951 | Griffiths | 33/601 |
| 3,456,501 | 7/1969 | Walker et al. | 33/601 |
| 3,744,142 | 7/1973 | Marshall | 33/601 |
| 3,765,098 | 10/1973 | Schafer, Sr. | 33/601 |
| 3,820,386 | 6/1974 | Grikscheit et al. | 33/601 |
| 4,580,446 | 4/1986 | Ansteth | 33/600 |
| 4,587,839 | 5/1986 | Doniwa | 33/DIG. 15 |

*Primary Examiner*—Christopher W. Fulton
*Attorney, Agent, or Firm*—Jones & Askew

[57] ABSTRACT

An apparatus and process which can be used to determine the top dead center position of a piston. The apparatus includes an actuator plunger which engages the rocker lever of an engine cylinder, and a gauge indicator to measure movement in the rocker lever when it is engaged by the piston. The process includes measuring the position of the piston on the upswing of the power cycle and in a corresponding position on the downswing of the piston during the exhaust cycle. The center point between these two measurements is the top dead center point of the piston.

15 Claims, 3 Drawing Sheets

INTAKE STROKE

COMPRESSION STROKE

POWER STROKE
(INITIATED BY IGNITION)

EXHAUST STROKE

APPARATUS AND PROCESS FOR DETERMINING TOP DEAD CENTER OF A PISTON AND CRANK SHAFT IN AN INTERNAL COMBUSTION ENGINE

TECHNICAL FIELD

The present invention relates generally to an apparatus and process to determine the absolute top dead center of a piston and crank shaft in an internal combustion engine. Determining the top dead center of a piston is a necessary first step in setting or adjusting the timing of the ignition of the fuel in the engine. For instance, in a diesel engine, the ignition timing is controlled by the fuel pump, which injects the fuel at a time measured from the top dead center of the piston.

BACKGROUND OF THE INVENTION

Diesel engines are used in a variety of different applications, such as school buses, trucks, generator sets, marine equipment and industrial equipment. Gasoline engines are also used in a variety of different applications, perhaps the most well-known and widespread of such uses being for motor vehicles, such as cars and trucks. If fuel systems are timed properly, economic benefits, such as less fuel consumption and longer lasting engine parts, and environmental benefits, such as cleaner engine emissions, are possible.

In the past, some engines were timed using an intrinsic built-in timing pin. Typically, as for instance in the Cummins midrange diesel engines, the timing pin is located on the front gear housing under the fuel pump, which is in a separate housing. Using this method, the timing pin slides into the camshaft gear in locating the piston positioned at top dead center. Because the timing pin is located in a separate housing in the engine, it is difficult to be precise when locating top dead center of the piston. Furthermore, because the typical current midrange engines have the accessory drive located beneath the fuel pump, it has become more difficult to gain access to the timing pin. Another disadvantage of the timing pin method is that it allows for a great opportunity of operator error in locating top dead center. This error can be caused if the timing pin is only slightly out of alignment with its access hole to the camshaft gear. Changing emission laws, costs of fuels and the demands on the engine have also made engine timing a more critical specification than it has been in the past. Based upon these disadvantages, it is currently extremely difficult and inefficient to use the timing pin method.

Another method for determining top dead center is the "positive stop" method. The "positive stop" method, if not performed correctly, involves a risk of severe engine damage. This engine damage can be caused if a large amount of torque is created when the valve contacts the piston. The torque in combination with the valve-piston contact can easily cause the valve to bend or become otherwise disfigured or to cause a push tube to bend. Furthermore, this method is not always accurate in determining top dead center. Using the positive stop method on a diesel engine, one would turn the engine piston to approximate top dead center on the number one cylinder, and then remove all fuel lines from the fuel pump and fuel injectors. After all of the fuel lines have been removed, the fuel injectors must be removed. Removal of the fuel lines and the fuel injectors can be a very time consuming process. The next step involves running the rocker adjustment screw down until there is no lash between the rocker lever and the valve stem on said cylinder number one. The rocker adjustment screw is then rotated until the valves are close to hitting the pistons. The engine is then turned until the piston has made contact with the valve. At this point, there is a possibility of bending or disfiguring the valve or bending a push tube if too much torque is created between the piston and the valve. A pointer is then installed on the front cover of the engine to reference the crank shaft to this position. The engine is then rotated in the opposite direction until the engine "locks down" or until the piston again contacts the valve causing the engine rotation to stop. There is also a potential for bending or disfiguring the valve or bending a push tube at this point in the process. The halfway point between this mark and the mark on the pointer when installed is top dead center. Using the "positive stop" method, the engine must then be reassembled and the valve lash adjusted before timing the fuel pump. These final tasks are very time consuming in and of themselves. These potential problems in the current practices of determining absolute top center have also dictated that a more efficient and simple way to determine absolute top dead be developed.

There are some devices which have been designed with the object of determining top dead center of a piston. Many of these designs use a variety of gauges to measure the movement of the piston in determining top dead center. These gauges typically access the piston through holes created by removed spark plugs or removed fuel injectors. In the apparatus for measuring piston position described in U.S. Pat. No. 3,765,098 issued to Schafer, Sr., a gauge indicator is placed directly on the piston by access means through a hole created by a removed spark plug. As the piston is displaced within the bore, the spindle is displaced on the gauge to develop readings indicative of the piston position. Other types of gauge indicators, such as those described in U.S. Pat. No. 3,744,142 issued to Marshall and U.S. Pat. No. 1,737,726 issued to Muzyn, describe devices which place gauge devices directly onto the pistons through a hole created by an absent spark plug. Although these type devices can provide accurate measurements for top dead center, there is a potential for error introduced by having to access the piston with a gauge through a hole that is created by a displaced spark plug. These devices also require the user to remove a spark plug completely in order to gain access to the piston. This step also includes the potential for damaging the spark plug during removal or during replacement after the timing is completed. These methods also do not take into account or measure for the lash in the crank shaft which is typically present during the piston's operation. Essentially, the methods which are known in the art only determine the top dead center of the piston. It is known in the art that, in normal operation of an internal combustion engine, the piston is at the top dead center during a period called the "piston duration." However, the crank shaft is at top dead center only at the mid-point of the piston duration. The prior art contains devices which locate top dead center of the piston in the piston duration, but not necessarily at the point where the crank shaft is also at top dead center.

Accordingly, there is a need for a timing apparatus which provides little chance for engine damage in use, does not require access to the piston via a hole created by removal of a spark plug or a fuel injector, and maximizes the efficiency of an engine by precisely determining top dead center of the piston and crank shaft so that the engine can be properly timed.

SUMMARY OF THE INVENTION

The present invention provides a unique apparatus and related process which determines top dead center of a piston and crank shaft in an engine without using access through a hole created by a removed spark plug or a removed fuel injector, without using the "positive stop" method and without the need to use or access the timing pin.

Briefly described, the apparatus of the present invention provides an improved timing apparatus used in determining top dead center of a piston and crank shaft in a four-cycle internal combustion engine. The timing fixture comprises a frame generally defining two pieces of material, preferably metal, parallel or nearly parallel to each other, separated by a third piece of material, preferably metal, which is perpendicular or nearly perpendicular to said first two pieces of material wherein said parallel pieces of material extend from said perpendicular piece of material in opposite directions. Means are provided for operatively associating said frame to an engine cylinder head. An actuator plunger is operatively associated with said frame. Said actuator plunger is strong enough to engage and displace the intake valve of said engine when contacting said valve. Means are also provided for measuring movement in said actuator plunger.

More particularly described, the means for operatively associating said frame to an engine cylinder head preferably comprise a plurality of mounting holes in the base of said frame through which mounting bolts are placed. This arrangement provides that said frame is properly attached to the engine cylinder head of said engine in order to provide little or no movement of said frame during the operation of the timing apparatus.

The preferred actuator plunger comprises a metal rod with at least one spring which urges said rod downward. Said spring in said actuator plunger is strong enough to engage and depress said intake valve such that said valve is able to make contact with said piston. An adjustment nut and sleeve preferably provides means for operatively associating said actuator plunger to said frame. This adjustment nut and sleeve can also preferably control the movement of said plunger either by causing it to compress, against the natural tendencies of said spring, or by permitting said spring to urge said rod downward. Said adjustment nut and sleeve allows the user to manually adjust the position of said actuator plunger, if required. The rod is used to measure movement of the rocker arm controlling the intake valve on the cylinder where piston movement is being determined.

The preferred means for measuring movement in said actuator plunger is a typical timing dial indicator gauge which is commonly known in the industry. Said dial indicator gauge preferably is set directly upon the top of said actuator plunger and is operatively associated to said frame by means of a post. Said post is preferably attached to the top of said frame and to said dial indicator by means of an arm extending from the base of said post.

The present invention also involves a process for locating top dead center of said piston and crank shaft. Essentially, the process of the present invention involves using movements in the rocker arm of said intake valve on said engine cylinder to measure two points which are equidistant from top dead center of the piston and the crank shaft, and then rotating the engine to a point half-way between these two marks. The measurement of piston movement is recorded by engaging the intake valve of said engine to said piston and measuring corresponding movement in the rocker arm of said intake valve. More specifically, the process of the instant invention involves using an indicator gauge to pick a point on the upswing of the compression stroke in said engine. After the first point is recorded the engine is rotated past top dead center to a point where, during the start of the power cycle, a mark can be made which corresponds to said first point. Using any commercially available gauge indicator, this corresponding second point will show a gauge reading which is identical to the first gauge reading for said first point. The half-way point between the first mark and the second mark is top dead center for the piston and the crank shaft. Said engine can be rotated to said top dead center point by rotating the engine in the opposite direction of rotation past the top dead center point. Thereafter, the engine is rotated in the normal direction of rotation until the top dead center point is reached.

The preferred process of the present invention involves the use of the timing fixture as claimed; however, the disclosed process of the present invention would also be applicable to any other timing fixture which measured piston location via movement of the rocker arm on the intake valve of an engine cylinder. In the preferred process of the present invention, a timing apparatus, preferably the timing apparatus as described with the present invention, is attached to the engine cylinder head, with an actuator plunger in a retracted position. At this point in the procedure, both the intake valve and the exhaust valve of the engine cylinder should be in a closed position. The timing fixture is attached so that the actuator plunger is directly over the end of the rocker arm or lever controlling movement of the intake valve to said engine. Thereafter, an adjustment device, typically an adjustment nut and sleeve, for the actuator plunger is loosened until the plunger rests on the end of the rocker lever, causing the rocker lever to descend, and so that said adjustment device has little or no tension on it. Said adjustment device is then slightly tightened, preferably by approximately one-quarter revolution of said adjustment device.

A dial indicator gauge, of the type commonly known in the industry, is then placed on top of the actuator plunger with one millimeter preloaded on said gauge. Said gauge is then locked. The engine is then rotated in the normal direction of rotation until an additional millimeter is registered. A pointer is then installed on the engine fan hub bolt and a marking strip approximately four inches long is installed on the fan belt of the engine. Thereafter, the strip is marked at the position indicated by the pointer. The engine is rotated in the same direction until the dial indicator stops approximately at its initial one millimeter setting. (If the dial indicator does not stop at its initial one millimeter setting, the process should be re-started.) The engine is then rotated in the opposite direction until two millimeters is showing on the gauge. The strip is then again marked at the end of the pointer, and the distance between the two marks on the strip is measured. An absolute timing mark is made by making a third mark halfway between said two previous marks. Thereafter, the engine is again rotated in the direction opposite normal rotation until the absolute timing mark is passed, and is then reversed back in the direction of normal rotation to the absolute timing mark. The piston and crank shaft are now at top dead center, and normal procedures for pump timing are then followed.

Accordingly, it is an object of the present invention to provide a timing apparatus which is extremely accurate and efficient in measuring top dead center of piston and crank shaft with little potential for engine damage and no requirement for access to the piston via a hole created by a removed spark plug or a removed fuel injector.

It is another object of the present invention to eliminate the need for or use of the timing pin when locating the top dead center of a piston in an internal combustion engine.

It is another object of the present invention to minimize exhaust pollutants from midrange engines by providing accurate measurements in determining top dead center of the piston and crank shaft in an internal combustion engine.

It is another object of the present invention to provide a more accessible means for timing the fuel pump on a diesel engine.

It is another object of the present invention to provide a process to determine top dead center of a piston and crank shaft in an internal combustion engine in an efficient and economical manner.

It is another object of the present invention to provide a process to determine the top dead center of a piston and a crank shaft in an internal combustion engine without use of a timing pin.

Other features, objects and advantages of the present invention will become apparent upon reading the following specification when taken in conjunction with the drawings and the appended claims.

DETAILED DESCRIPTION OF THE DRAWINGS

Figure 1A:
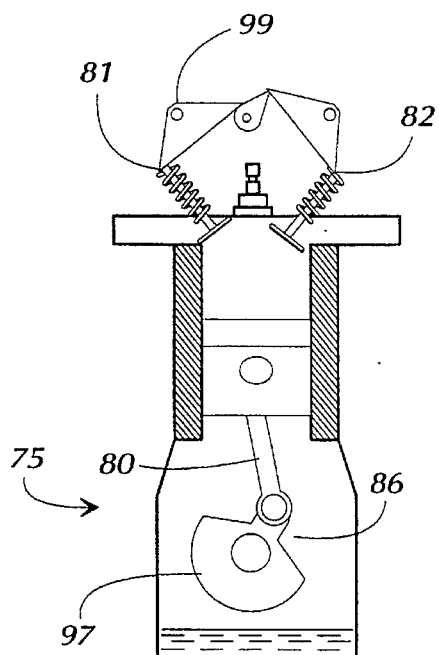
FIGS. 1(a–d) are diagrams which illustrate the four cycles of an internal combustion engine.
Figure 1B:
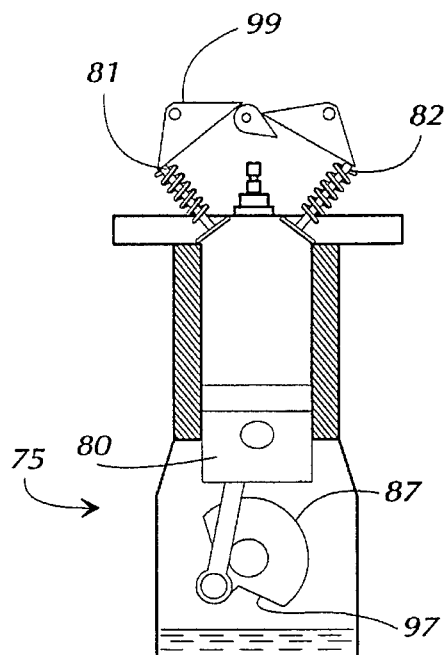
Figure 1C:
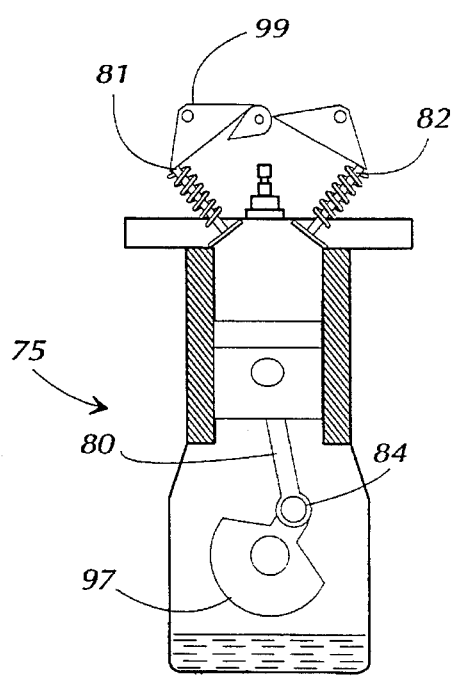
Figure 1D:
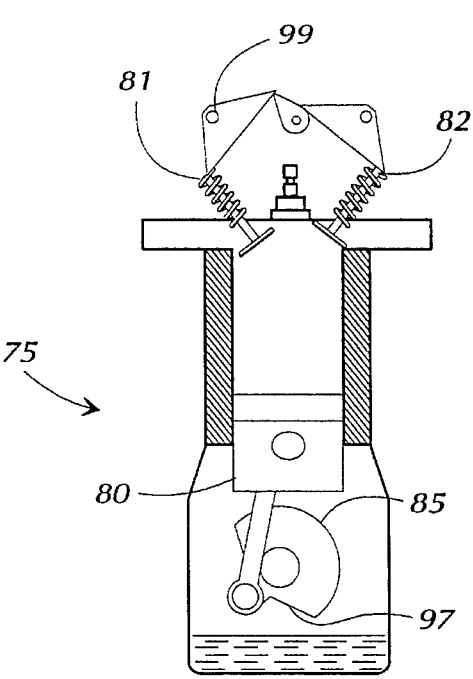

Referring now in more detail to the drawings, in which like numerals represent like parts through the several parts, FIG. 1 illustrates the four cycles of an internal combustion engine 75. Typically, there are four cycles in the operation of an internal combustion engine 75, as shown in FIG. 1a, b, c and d. FIG. 1a illustrates the piston 80 and valves 81 and 82 as positioned during the intake cycle; FIG. 1b illustrates the piston 80 and valves 81 and 82 as positioned during the compression cycle. FIG. 1c illustrates the piston 80 and valves 81 and 82 as positioned during the power cycle; FIG. 1d illustrates the piston 80 and valves 81 and 82 as positioned during the exhaust cycle. The operation of the piston 80 in combination with the intake valve 81 and the exhaust valve 82 during the operation of an internal combustion engine are well-known in the industry.

In timing an engine, it is important that the piston be initially placed at the top dead center position. Top dead center is located at the point between the end of the compression cycle 87 and the start of the power cycle 84. Although it appears that the piston is also at top dead center at the point between the intake cycle 86 and the exhaust cycle 85, it is important to measure top dead center between the compression 87 and power 84 cycles. It is also generally known in the industry that the crank shaft 97 controls the movement of said piston 80. Due to the lash in the crank shaft 97, typically about 0.02 millimeters, said piston 80 is at absolute top dead center for a period of time in the cycle commonly called the "piston duration" in the industry. The crank shaft 97 and said piston 80 are both at top dead center at the midpoint of the piston duration. The present invention, in addition to other features, is able to locate the point where both the piston and the crank shaft are at the top dead center position.

Figure 2:
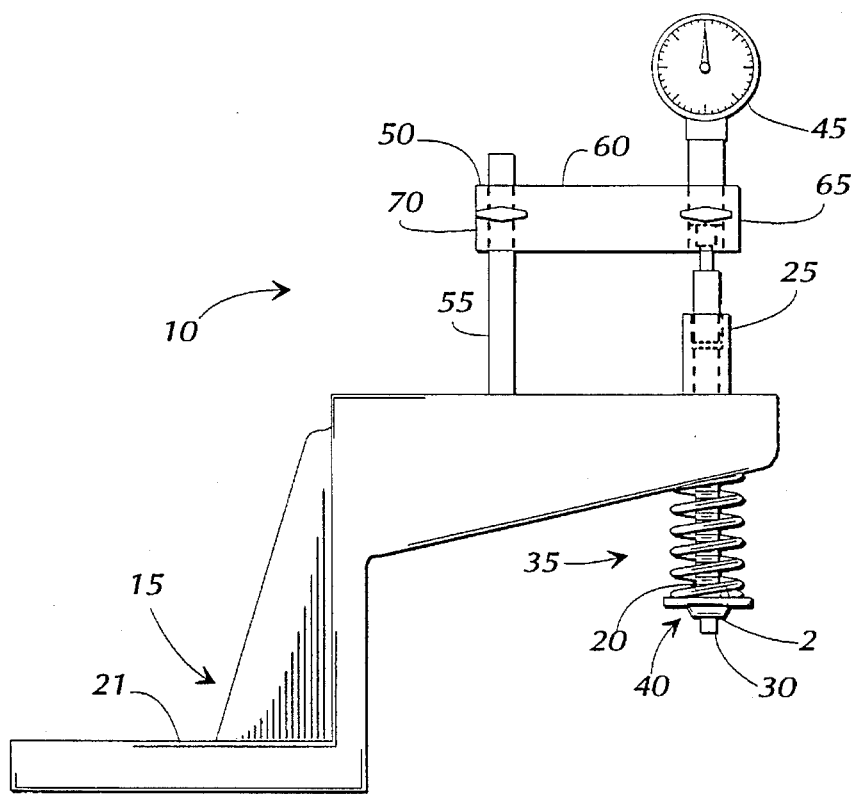
FIG. 2 is a side elevation view of the fuel pump timing apparatus constructed in accordance with the preferred embodiment of the present invention.

FIG. 2 illustrates a fuel pump timing fixture 10 constructed in accordance with the preferred embodiment of the present invention. The preferred timing apparatus 10 includes a frame 15 which is made of metal or any other material which is durable and maintains its physical characteristics when exposed to heat or petroleum products. Said frame 15 is constructed so that, on one end, it can easily attach to an engine cylinder head 96, preferably via a plurality of mounting holes 17 through which mounting bolts 92 are placed to secure said frame 15 to said engine cylinder head 96.

An actuator plunger 20 is operatively associated with said frame 15. Said actuator plunger 20 is preferably associated to said frame 15 by means of an adjustment nut and sleeve 25. The preferred actuator plunger 20 comprises a metal rod 30 with a stopper device 40 permanently attached to its bottom such that said stopper device 40 moves as if it was part of said metal rod 30. Said metal rod 30 is preferably threaded on its top end such that it can be easily operatively associated with said adjustment nut and sleeve 25. The preferred actuator plunger 20 also comprises a spring member 35 which urges said plunger 20 downward by pressing against the stopper device 40.

Movement of said actuator plunger 20 can be manually controlled by turning said adjustment nut and sleeve 25 either clockwise or counter-clockwise. Said adjustment nut and sleeve 25 can be tightened in order to retract or move said actuator plunger 20 upward, against the natural tendencies of said spring 35. On the other hand, if said adjustment nut and sleeve is loosened, said spring 35 will be permitted to urge said plunger 20 downward. Said adjustment nut and sleeve 25 is preferably greater than 0.75 inches in length such that no threaded portion of said metal rod 30 is permitted to go below the bottom end of said adjustment nut and sleeve 25. The preferred spring 35 has a compression strength large enough to urge said actuator plunger 20 downward but no so large that it would damage the rocker arm 99 to said intake valve 81 when said intake valve 81 comes into contact with said piston 80. Said spring 35 is commercially available from several different sources.

In the preferred embodiment of the timing fixture 10, a timing dial indicator 45, which are commonly known in the industry, is placed upon the top of the metal rod 30 such that said timing dial indicator 45 can measure the movement, either upward or downward, of said metal rod 30 in said actuator plunger 20. Said dial indicator 45 is held in place atop said metal rod 30 by means of a post 50. Said post 50 is comprised of essentially two parts, a base 55 and an arm 60, one being operatively associated with the other by means of a first thumb screw 70. Said arm 60 is preferably operatively associated with said dial indicator 45 by means of a second thumb screw 65, such that the movement of the dial indicator 45 is restricted to measuring changes in position of said metal rod 30. Using the preferred timing apparatus 10, movement in said piston 80 is measured by movement in the rocker arm 99 of the intake valve 81. Said intake valve 81 is caused to be associated with said piston 80 by means of the actuator plunger 20 urging said intake valve 81 downward.

Figure 3:
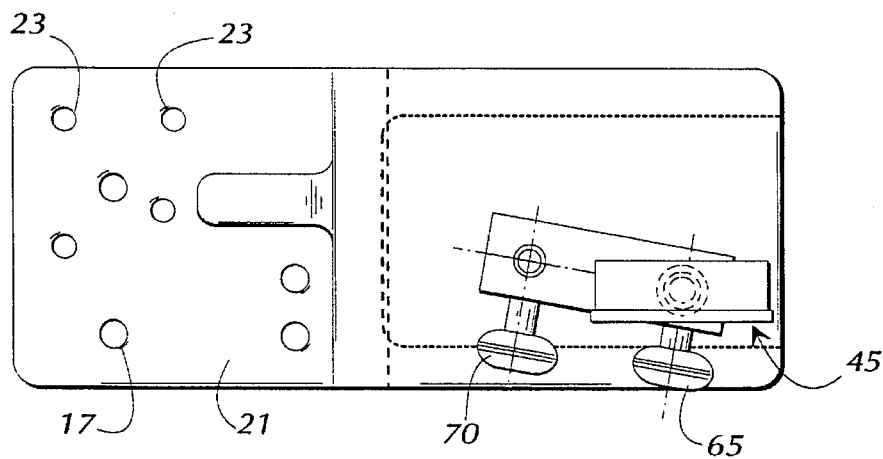
FIG. 3 is a top plan view of the preferred fuel pump timing apparatus shown in FIG. 2.
Figure 4:
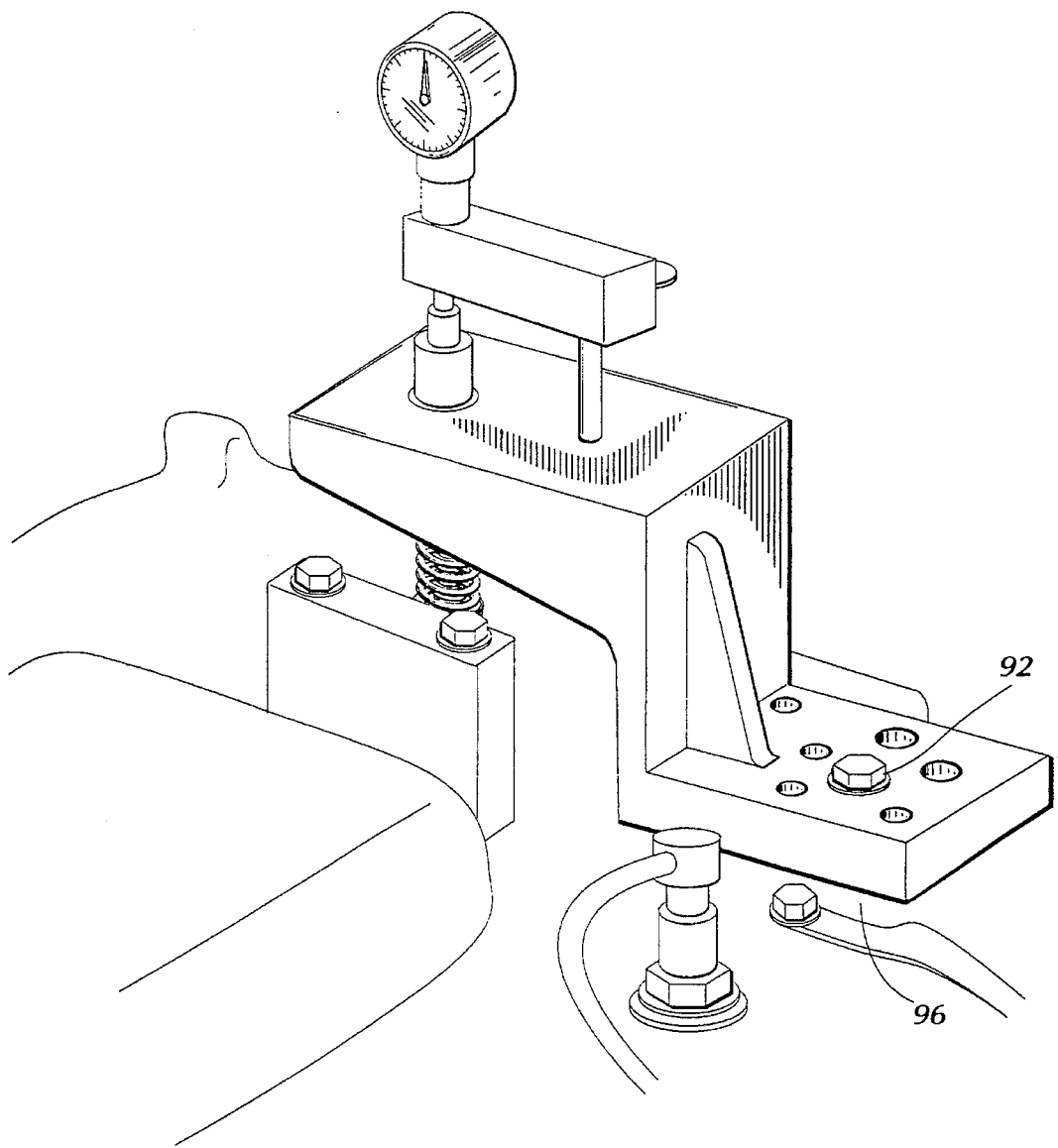
FIG. 4 is a drawing showing the preferred embodiment of the present invention installed on an engine, with the actuator plunger in contact with the valve rocker arm.

FIG. 3 is a top view of the preferred fuel timing fixture 10 as shown in FIG. 2. Several different mounting holes 17 are provided for on the base 21 of said frame 15. Although only two mounting bolts 91 are required to secure said frame 15 to any given engine cylinder head, the preferred embodiment of said timing fixture 10 provides for a plurality of mounting holes 17 to allow the user to secure said frame 15 to a variety of different engine cylinder heads with little or no frame 15 movement once secured. At least two storage holes 23 are provided for to store said mounting screws during periods of non-use. Preferably, said storage holes 23 are threaded so that they hold the mounting screws securely during periods of non-use. Said storage holes 23, unlike said mounting holes 17, are preferably not open on the bottom to prevent a mounting bolt 92 being stored in said storage hole 23 to go completely through said frame 15.

In the preferred embodiment of the present invention, said arm 60 is operatively associated to said dial indicator 45 by means of a thumb screw 65. A thumb screw 70 also operatively associates with said arm 60 to said base 55. Said thumb screws 65 and 70 are widely known in the industry and commercially available. Although it is preferable to use thumb screws 65 and 70 to operatively associate said dial indicator 45 to said arm 60, and said arm 60 to said post base 55, many other means, such as other types of screws or soldering the pieces together, can be used.

Thus, it is apparent that there has been provided, in accordance with the invention, a timing apparatus, and a process for using said timing apparatus to determine top dead center of a midrange engine, that fully satisfies the objects, aims and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A process for locating top dead center position of a piston and crank shaft in an internal combustion engine, the internal combustion engine including a piston capable of traveling in a first or a second opposing direction along a piston path defined within an engine cylinder, the piston being operatively interconnected with a crank shaft and a cylinder valve, the cylinder valve being yieldably biased by a first spring force urging the cylinder valve into sealing engagement with a cylinder valve aperture, the piston path being defined at one end by a top dead center position, comprising the following steps:

yieldably positioning a portion of said cylinder valve within said cylinder such that it interferes with said piston path;

rotating said crankshaft of said internal combustion engine such that said piston moves in said first upward direction along said piston path and engages said cylinder valve during said piston's upward travel;

measuring and marking a first timing point on a reference surface indicative of a first piston position along said piston path during said piston's travel in said first direction;

rotating said crank shaft in the same direction until said piston returns to said first piston position along said piston path during said piston's travel in said second direction, said valve remaining yieldably engaged with said piston and following said piston's movement;

measuring and marking a second timing point on said reference surface indicative of the first piston position along said piston path; and measuring and marking a third timing point on said reference surface approximately half-way between said first and second timing marks, whereby said third timing point is indicative of piston top dead center position at the end of said piston path.

2. The process of claim 1, wherein said first timing point is measured and marked during the compression stroke of said engine and said second timing point is measured and marked during the power stroke of said engine.

3. The process of claim 1 where in the step of yieldably positioning portions of said cylinder valve within said piston path includes the step of overcoming said first spring force by a counteracting second spring force applied to said cylinder valve, said second spring force being greater than said first spring force.

4. The process of claim 1 wherein the steps of measuring and marking said first and second points on said reference surface includes the step of measuring the position of said cylinder valve as it moves within said cylinder yieldably engaged with said piston.

5. A process for locating top dead center position of a piston and crank shaft in an internal combustion engine and positioning said internal combustion engine at said top dead center position, said internal combustion engine including a piston capable of traveling in a first or a second opposing direction along a piston path defined within an engine cylinder, said piston being operatively interconnected with a crank shaft and a cylinder valve, said cylinder valve being yieldably biased by a first spring force urging said cylinder valve into sealing engagement with a cylinder valve aperture said piston path being defined at one end by a top dead center position, comprising the following steps:

yieldably positioning portions of said cylinder valve within said cylinder such that it interferes with said piston path;

rotating said crankshaft of said internal combustion engine such that said piston moves in said first upward direction along said piston path and engages said cylinder valve during said piston's upward travel;

measuring and marking a first timing point on a reference surface indicative of a first piston position along said piston path during said piston's travel in said first direction;

rotating said crank shaft in the same direction until said piston returns to said first piston position along said piston path during said piston's travel in said second direction, said valve remaining yieldably engaged with said piston and following said piston's movement;

measuring and marking a second timing point on said reference surface indicative of the first piston position along said piston path;

measuring and marking a third timing point on said reference surface approximately half-way between said first and said second timing marks, whereby said third timing point is indicative of piston top dead center position at the end of said piston path;

rotating said crank shaft of said internal combustion engine such that said piston is ascending during the power stroke; and stopping said rotation of said crankshaft when said piston position corresponds to said third timing point.

6. The process of claim 5 wherein said first timing point is measured and marked during the compression stroke of said engine and said second timing point is measured and marked during the power stroke of said engine.

7. The process of claim 5 where in the step of yieldably positioning portions of said cylinder valve within said piston path includes the step of overcoming said first spring force by a counteracting second spring force applied to said cylinder valve, said second spring force being greater than said first spring force.

8. The process of claim 5 wherein the steps of measuring and marking said first and second points on said reference surface include the step of measuring the position of said cylinder valve as it moves within said cylinder yieldably engaged with said piston.

9. A method of locating top dead center of a piston and crank shaft in an internal combustion engine, the internal combustion engine including a piston capable of traveling in a first or a second opposing direction along a piston path defined within an engine cylinder, said internal combustion engine having a crankshaft and a cylinder valve interconnected with said piston, said cylinder valve being yieldably biased by a first spring force urging said cylinder valve into sealing engagement with a cylinder valve aperture, the piston path being defined at one end by a top dead center position, comprising the steps of:

yieldably positioning a portion of said cylinder valve within the cylinder such that it interferes with said piston path;

positioning said piston at a point during said piston's compression stroke so that said piston engages said cylinder valve;

applying a force to urge said piston downward;

rotating said crank shaft of said internal combustion engine in the direction of normal engine rotation against the force urging said piston downward;

measuring cylinder valve movement to determine said piston position and stopping said crankshaft rotation when said piston reaches a predetermined piston position in its travel in said first direction;

making a first timing mark, on a reference surface, indicative of the position of said crank shaft stopped at the predetermined piston position;

rotating said crank shaft in the direction of normal engine rotation against the force urging said piston downward so that said piston moves through the top dead center position;

measuring cylinder valve movement to determine the piston position and stopping said rotation when said piston reaches the predetermined piston position; and making a second timing mark, on said reference surface, indicative of the position of said crank shaft stopped at the predetermined piston position, wherein a point approximately half way between said first and said second timing marks is indicative of piston and crankshaft top dead center position at the end of said piston path.

10. The process of claim 9 wherein said step of yieldably positioning portions of said cylinder valve within said cylinder along said piston path to urge said piston downward includes the steps of overcoming said first spring force by applying a counteracting second spring force to said cylinder valve, said second spring force being greater than said first spring force so that said cylinder valve interferes with said piston path.

11. The process of claim 9 further including the step of making a third timing mark on said reference surface at a point approximately one-half way between said first timing mark and said second timing mark, said third timing mark being indicative of piston top dead center position at the end of said piston path.

12. A method of locating top dead center of a piston and crank shaft in an internal combustion engine, the internal combustion engine including a piston capable of traveling in a first or a second opposing direction along a piston path defined within an engine cylinder, said internal combustion engine having a crankshaft and a cylinder valve interconnected with said piston, said cylinder valve being yieldably biased by a first spring force urging said cylinder valve into sealing engagement with a cylinder valve aperture, the piston path being defined at one end by a top dead center position, comprising the steps of:

yieldably positioning a portion of said cylinder valve within said cylinder such that it interferes with said piston path;

positioning said piston of said internal combustion engine at a point along the piston path during the compression stroke so that said piston engages said yieldable cylinder valve;

applying a force to urge said piston downward;

rotating said crank shaft of said internal combustion engine in the direction of normal engine rotation against the force urging said piston downward;

measuring cylinder valve movement to determine the piston position and stopping said rotation when said piston reaches a predetermined piston position in its travel in said first direction;

making a first timing mark, on a reference surface, indicative of the position of said crank shaft with said piston stopped at the predetermined piston position;

rotating said crank shaft in the direction of normal engine rotation against the force urging said piston downward so that said piston moves through the top dead center position and to a point lower than the predetermined piston position;

rotating said crank shaft in the direction opposite the direction of normal engine rotation against the force urging said piston downward;

measuring cylinder valve movement to determine the piston position and stopping the rotation when said piston reaches the predetermined piston position; and making a second timing mark, on said reference surface, indicative of the position of said crank shaft with said piston stopped at the predetermined piston position, wherein a point approximately half way between said first and said second timing marks is indicative of piston top dead center position at the end of said piston path.

13. The process of claim 12 further including the step of making a third timing mark on said reference surface at a point approximately one-half way between said first timing mark and said second timing mark, said third timing mark being indicative of piston top dead center position at the end of said piston path.

14. A process for determining the top dead center position of a piston and crankshaft in an internal combustion engine and positioning said internal combustion engine at top dead center position, said internal combustion engine including a piston capable of traveling in a first or a second opposing direction along a piston path defined within an engine cylinder, the piston being operatively interconnected with a crank shaft and a cylinder valve, the cylinder valve being yieldably biased by a first spring force urging the cylinder valve into sealing engagement with a cylinder valve aperture, the piston path being defined at one end by a top dead center position, comprising the following steps:

rotating said crankshaft of said internal combustion engine such that said piston is traveling in said first direction during the compression stroke;

attaching a timing apparatus to said engine, said timing apparatus having an adjustable actuator plunger adapted to yieldably position said cylinder valve in said cylinder;

adjusting said actuator plunger to cause said cylinder valve to become yieldably positioned in said engine cylinder such that it interferes with said piston path;

providing a dial indicator gauge engaged with said actuator plunger and operatively interconnected with said valve to measure valve movement;

rotating said engine in the normal direction of rotation until said piston engages said valve and said dial indicator indicates a piston reference position;

providing a movable reference surface and a reference pointer stationary with respect to said engine and associated with said crankshaft of said internal combustion engine;

making a first timing mark indicative of the piston reference position on said reference surface adjacent said reference pointer;

rotating said engine in the normal direction of rotation until said dial indicator indicates the piston reference position;

making a second timing mark indicative of the piston reference position on said reference surface adjacent said reference pointer;

measuring the distance between said first timing mark and said second timing mark and making a third timing mark on said reference surface at a point approximately one half the distance between said first mark and said second mark, said third mark being indicative of piston top dead center position at the end of said piston path;

rotating said engine so that said reference pointer is in registration with said third timing mark, thereby placing said piston and crank shaft at top dead center.

15. A process for locating a top dead center position of a piston and crank shaft in an internal combustion engine, the internal combustion engine including a piston capable of traveling in a first or a second opposing direction along a piston path defined within an engine cylinder, the piston being operatively interconnected with a crank shaft and a cylinder valve, the cylinder valve being yieldably biased by a first spring force urging the cylinder valve into sealing engagement with a cylinder valve aperture, the piston path being defined at one end by a top dead center position, comprising the following steps:

yieldably positioning a portion of said cylinder valve within said cylinder such that it interferes with said piston path, rotating said crankshaft so that said piston engages said cylinder valve and causes said valve to move in response to the crankshaft rotation; and measuring the valve movement to determine the top dead center position of said piston.

* * * * *